(12) United States Patent
Plunket et al.

(10) Patent No.: US 8,404,068 B2
(45) Date of Patent: *Mar. 26, 2013

(54) METHOD AND APPARATUS FOR PRE-FABRICATING A SYNTHETIC SPORTS FIELD

(75) Inventors: Christopher Sean Plunket, Raleigh, NC (US); Ryan Whitman Paris, Ringgold, GA (US); James S. Street, Rock Springs, GA (US)

(73) Assignee: Textile Management Associates, Inc., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,407

(22) Filed: Jan. 20, 2012

(65) Prior Publication Data

US 2012/0111474 A1    May 10, 2012

Related U.S. Application Data

(63) Continuation of application No. 12/367,909, filed on Feb. 9, 2009, now Pat. No. 8,123,880.

(60) Provisional application No. 61/027,140, filed on Feb. 8, 2008.

(51) Int. Cl.
*B23B 37/00*    (2006.01)

(52) U.S. Cl. ............. 156/250; 426/17; 156/60; 156/256
(58) Field of Classification Search .................. 156/60, 156/250, 256; 404/73; 428/17
See application file for complete search history.

(56) References Cited

U.S. PATENT DOCUMENTS

| | | | |
|---|---|---|---|
| 7,189,445 B2 | 3/2007 | Knox | |
| 7,249,913 B2 * | 7/2007 | Linville | ......................... 404/73 |
| 8,123,880 B2 * | 2/2012 | Plunket et al. | .................. 156/60 |
| 2002/0136846 A1 | 9/2002 | Prevost | |
| 2005/0281963 A1 | 12/2005 | Cook | |
| 2006/0039754 A1 | 2/2006 | Linville | |
| 2007/0101566 A1 | 5/2007 | Cook | |
| 2007/0248772 A1 | 10/2007 | Cook | |

* cited by examiner

*Primary Examiner* — Jeff Aftergut
(74) *Attorney, Agent, or Firm* — Luedeka Neely Group, P.C.

(57) ABSTRACT

A method of prefabricating and installing a synthetic turf field includes providing a controlled manufacturing facility with an open area that allows a plurality of turf strips to be laid out on a floor thereof. Visual markings are placed on the floor to allow the individual strips to be properly aligned on the floor. Once aligned, inlays can be placed into the proper strip and then secured. After the inlays have been secured, the strips can be rolled up and appropriately labeled for subsequent installation. After all the strips that will make up the field have been processed and rolled up, the rolls can be taken to the job site so the field can be installed.

12 Claims, 4 Drawing Sheets

METHOD AND APPARATUS FOR PRE-FABRICATING A SYNTHETIC SPORTS FIELD

CROSS-REFERENCE TO RELATED APPLICATIONS

This application is a continuation application of U.S. patent application Ser. No. 12/367,909 filed on Feb. 9, 2009, now U.S. Pat. No. 8,123,880, and titled "Method and Apparatus for Pre-Fabricating a Synthetic Sports Field," which claims the benefit of U.S. Provisional Patent Application Ser. No. 61/027,140 filed Feb. 8, 2008 and titled "Synthetic Turf Field Pre-Fabrication," the contents of both of which are hereby incorporated by this reference as though set forth fully herein.

TECHNICAL FIELD

The present application relates generally to synthetic turf systems. More particularly, the present invention relates to a method of prefabricating a synthetic turf system for subsequent installation.

BACKGROUND OF THE INVENTION

Methods for installing synthetic fields are well-known. As is well known, the installation method is primarily a manual process and typically differs from field to field. Most synthetic fields include a plurality of strips of synthetic turf that are placed or laid out on a substructure or sub-base, such as the ground, upon which the field is permanently installed. The strips together make up a completed synthetic field after they have been laid out, processed and then secured. Some or all of the strips of synthetic turf typically require markings thereon, such as yard line markings, numbers or the like. When the fields are installed, some of the markings, such as logos, yard line numbers, and hash marks are inserted into the field after it has been placed on the subbase at the location where the field is to be permanently located. As can be appreciated, the position of each individual strip with respect to the overall synthetic field is important. Similarly, the location of the markings on each of the individual strips is critical to the overall appearance of the field. If the markings are inserted in the field improperly, they can be out of alignment with respect to the other markings on the field or can be individually crooked, which can make the field look sloppy.

Due to the nature of these fields, their construction, and the nature of the steps required for their installation, the typical manufacturing and installation steps suffer from a variety of disadvantages, including those discussed above. Also, the fabrication, manufacturing, and installation steps are extremely time consuming and labor intensive. Further, these steps can be extremely variable from field to field as well as costly due to the extensive labor commitment required.

SUMMARY OF THE INVENTION

It is therefore an advantage of the present invention to provide a method or process that reduces the inherent variables that exist with installing synthetic turf fields.

It is another advantage of the present invention to reduce or minimize the inherent variables that exist with installing synthetic turf fields, which can negatively affect the quality, cost, and/or appearance of these fields.

It is a further advantage of the present invention to provide a process or method that improves the quality of the manufacturing as well as the installation of synthetic turf fields.

It is still a further advantage of the present invention to provide a process or method that decreases the cost associated with the manufacturing as well as the installation of synthetic turf fields.

It is still another advantage of the present invention to provide a process or method that decreases the time required for the manufacturing as well as the installation of synthetic turf fields.

It is yet a further advantage of the present invention to provide a process or method of installing a synthetic turf field that provides more uniformity than prior methods and minimizes the inherent variables that can exist from field to field.

In accordance with the above and the other advantages of the present invention, a method of prefabricating and installing a synthetic turf field is provided. The method includes the steps of laying the field out in a controlled manufacturing facility by placing a plurality of individual strips of turf onto the facility floor such that the strips are properly and correctly aligned for proper fabrication and installation of the complete field. The controlled manufacturing facility is preferably an indoor facility. Thereafter, any inlays for the pre-fabricated field are inserted into the applicable individual strips at the appropriate place in the controlled manufacturing facility such that they are in the proper location when the entire field is subsequently installed. The inlays can include, numbers, hash marks, arrows, and/or other ancillary field markings. Obviously, other inlays may also be available for prefabrication such that they are already present in the strips when the field is installed.

Additionally, the processes in the manufacturing facility are preferably under controlled conditions for every field, thereby minimizing ever-changing and unpredictable variables like weather, crew skill level, tools, and installation means and methods. Upon completion of the inlay insertion and other prefabrication steps, the individual strips are rolled up and the plurality of rolls are transferred to the installation site. All of the necessary equipment to assist in the prefabrication process are located at the indoor facility. Once the synthetic turf rolls arrive at the installation site, the installation crew will have less work to perform to complete the job because of the installation of the inlays during the pre-fabrication process. Accordingly, the time and cost associated with the on-site installation will be reduced.

These and other features and advantages of the present invention will become apparent from the following description of the invention, when viewed in accordance with the accompanying drawings and appended claims.

DETAILED DESCRIPTION OF THE PREFERRED EMBODIMENT

The present invention relates to prefabricating a synthetic turf field for later installation. More specifically, the present invention relates to a method of prefabricating a synthetic turf field prior to installation at a different permanent location. The prefabrication process helps ensure accurate installation of the synthetic field in a more economic, consistent and cost effective manner. The prefabrication process also helps minimize or eliminate variables that may exist in different installations, including due to weather, crew skill level, tools, and installation methods. The steps of the method or process for prefabricating a synthetic turf field for subsequent installation as well as the installation steps are discussed in connection with the preferred embodiments described below with reference to the accompanying figures.

Figure 1:
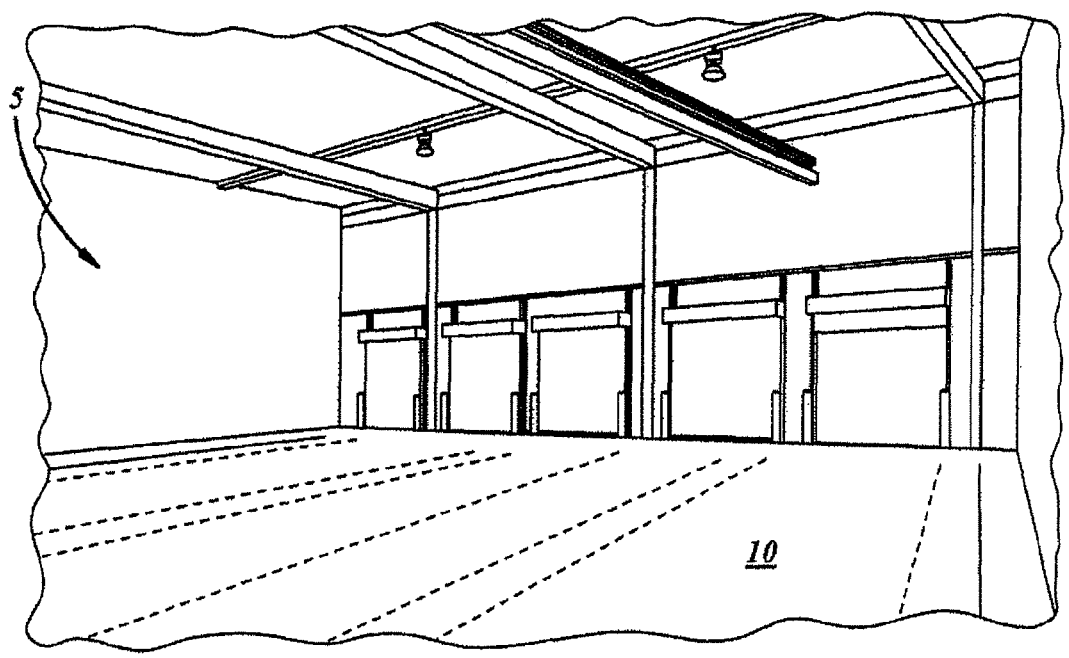
FIG. 1 is a partial perspective view of an indoor manufacturing facility for prefabrication of a synthetic sports field in accordance with a preferred embodiment of the present invention.

Referring now to FIG. 1, in accordance with a preferred embodiment of the present invention, a facility 5 is provided where the synthetic turf field is initially fabricated. The facility 5 is preferably a controlled facility such as an indoor manufacturing facility, which is not the location where the synthetic field will be permanently installed. The facility 5 includes an open area with a substantially flat floor 10 on which the various components that will be used to make the synthetic field can be laid out for prefabricating. It will be understood that the substantially flat floor 10 and the working area must be sufficiently large or of sufficient size to roll out or lay out the synthetic turf strips that will be prefabricated and then utilized to make up the full synthetic turf field. It is also preferable that the facility has room for the other components that are used to make up the completed synthetic field, including the various markings to be inlayed, as discussed in more detail below.

In one embodiment, an initial step of the prefabricating process includes visually indicating on the floor 10 of the facility 5 certain dimensions corresponding to locations on the field. These visual indications will assist in the alignment, orientation, and sizing of the individual synthetic strips. The dimensions are preferably marked permanently on the floor 10. However, it will be understood that the visual markings can be releasably secured or fixed to the floor 10 in the event fields of different sizes or configurations require prefabrication. For example, the hash marks for a professional football field are positioned in a different location than a college football field.

Figure 2:
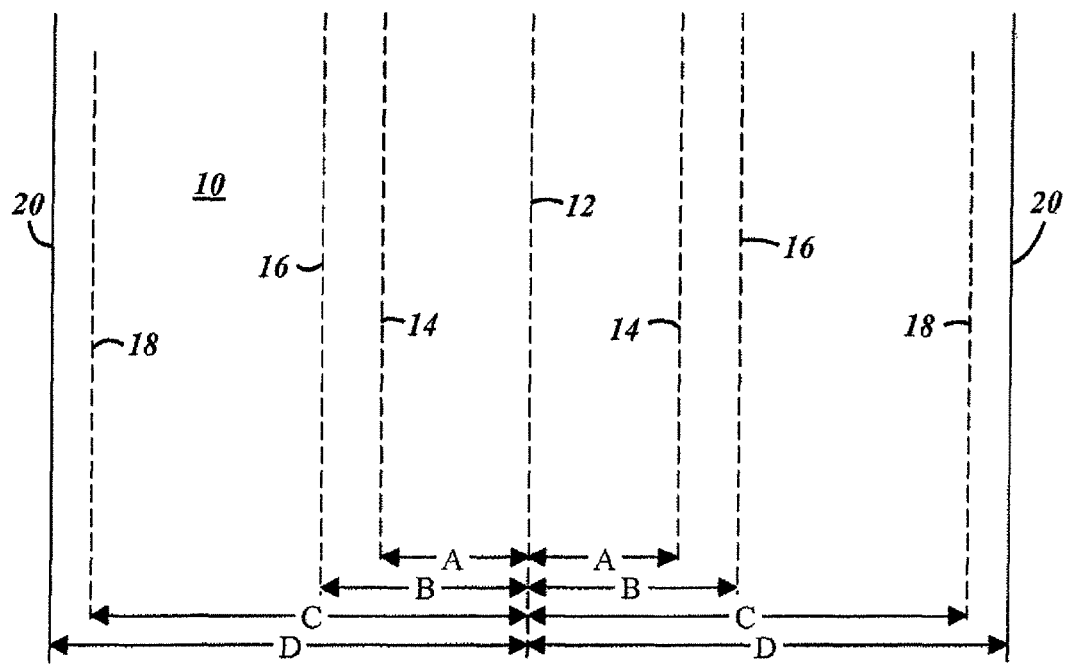
FIG. 2 is a schematic illustration of a floor of an indoor manufacturing facility for prefabrication processing of a synthetic sports field with visible markings thereon in accordance with a preferred embodiment of the present invention.

As shown in FIG. 2, a line corresponding to the centerline of the field (in the direction from one end of the field to the other) is preferably marked on the floor 10 and is generally designated by reference number 12. This line allows for alignment of each of the strips at a location corresponding to the center of the field. Also, lines corresponding to the locations on the field where the hash marks are to be positioned are also visually indicated or marked on the floor 10 and are generally indicated by reference number 14. These markings 14 are preferably intended to indicate a particular portion of the hash marks, such as an inner edge thereof (closest to the center of the field), which will ensure accurate alignment. However, it will be understood that the markings 14 could be positioned to align with the outer edge of the markings etc. However, each of the lines 14 should be spaced an equal distance from the centerline 12, as indicated by reference letters A.

Lines, generally indicated by reference number 16, are also placed on the floor 10 at locations corresponding to positions on the field where yard line numbers need to be located. Again, the markings 16 can be positioned at an inner edge of the yard line numbers to assist in proper alignment. Moreover, the markings 16 can be positioned to align with another portion of the numbers, i.e., the outer edge. In any event, the markings 16 should be spaced an equal distance from the centerline 12, as indicated by reference letters B. Further, the locations on the field where the outer hash marks are to be inserted are marked on the floor 10, as generally indicated by the lines designated reference number 18. Again, the lines 18 can be located at the inner edges of the hash marks, the outer edges of the hash marks, or other suitable portions thereof. Again, the markings 18 are spaced an equal distance from the centerline 12 as indicated reference letters C.

Similarly, the locations where the sidelines of the field are located are marked on the floor 10 with lines generally indicated by reference number 20. The lines 20 assist in properly aligning, sizing and orienting the field and are also spaced an equal distance from the centerline 12, as indicated by reference letters D. It will also be understood that a variety of other dimensions could be marked on the floor 10 to assist in prefabricating the field for subsequent installation. Further, more or fewer dimensions could be marked or otherwise placed on the floor 10 as required. Also, while a variety of dimensions may be marked on the floor, they may not all be needed for the prefabrication of any individual field. Moreover, the distance of each of the lines from the centerline 12 can vary as needed.

In addition to providing a facility 5 of sufficient size to roll out the synthetic turf strips and marking certain dimensions corresponding to field locations on the floor 10, the preferred embodiment includes other steps for prefabricating a field for subsequent installation. Specifically, the facility 5 preferably has on hand and available all necessary equipment to fabricate the field and complete the prefabrication processes. Thus, all necessary equipment required by the installers for fabricating the field is readily available and includes: (1) transports for moving the rolls of synthetic turf from one location to another in the facility 5; (2) equipment for rolling out the rolls of synthetic turf onto the floor 10 for processing, and (3) equipment for rolling up the strips of turf into rolls. Additionally, the facility 5 should have sufficient space on at least one end of the working area to allow for material transport such as to the installation site. In accordance with a preferred embodiment, sufficient working area is estimated to be in the area of at least thirty (30) feet.

Moreover, in accordance with a preferred embodiment, the facility space where the synthetic turf will be worked on should be completely enclosed such that the temperature and climate can be maintained and controlled. Further, by keeping the work space completely indoors, the ability to control inherent variables that result from climate change is significantly enhanced. This configuration also assists in providing uniformity of field fabrication and installation. The facility should also have available all templates to allow for cutting numbers, hash marks, arrows and other ancillary markings that are required for the field. It will be understood that other steps and equipment may also be utilized to assist in improving the fabrication process.

Once the facility 5 is available and includes the necessary equipment and space, the prefabrication process of the field can be performed. At the outset, a plurality of rolls that together will form an entire synthetic sports field are selected for the prefabrication process, such that the appropriate number of rolls of turf are on hand. Each individual roll consists of a discrete strip 22 of synthetic turf that is positioned in the working area. The configuration of each strip in an unrolled position is well known and consists of a front side 24 and a back side 26. The back side 24 consists of a base material with rows of tufted yarn secured thereto and extending outwardly from the front side 24 to form the synthetic turf surface. Each strip 22 also preferably includes a tufted line, generally designated by reference number 28, which is formed along the entire length of the roll (from one end to the other in a direction perpendicular to the centerline 12). The line 28 represents a yard line, such as a five yard line (i.e. 5, 10, 15, etc.), is preferably colored white, and is about four (4) inches in width. The yard line 28 is located adjacent one edge 30, 32 of each strip and while the line 28 extends from the front side 24, it is visible from the back side 26.

Each roll is positioned and oriented properly at one end of the working area before being rolled out and positioned on the floor 10 of the facility 5. Once positioned, the strip 22 of turf should be unrolled with the back side 26 up and the front pile side 24 down (up side down). When rolling out the strip 22 of turf, the grain of the turf is preferably facing the starting point of roll-out. However, the grain of the turf could alternatively face against the starting point of roll-out as it is being unrolled. It will be understood that a variety of other steps may be employed with respect to the roll selection and orientation steps. Further, the configuration of the tufts is not critical to the present invention.

Figure 3:
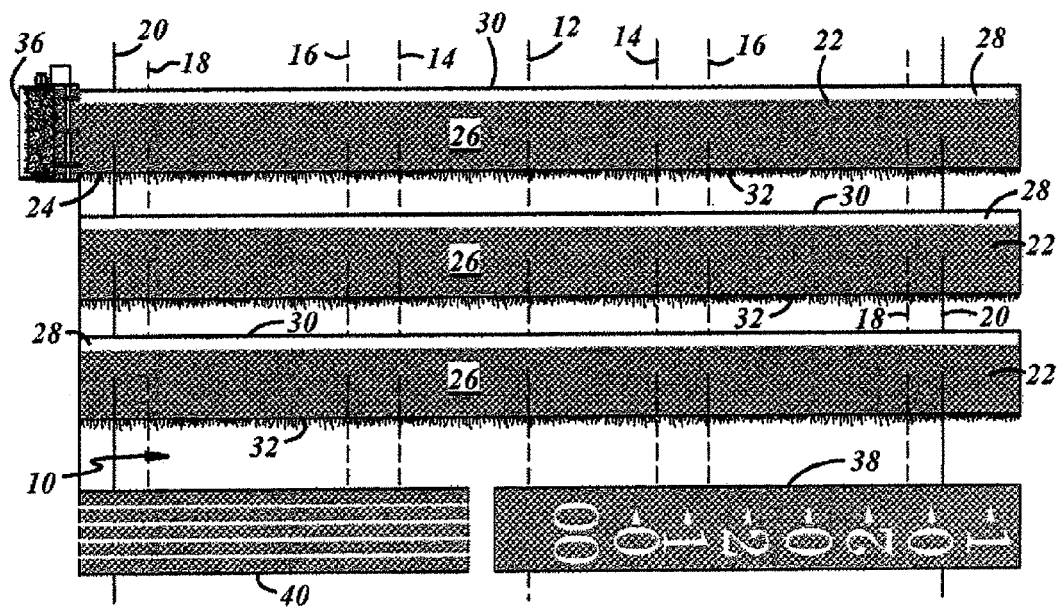
FIG. 3 is a schematic illustration of a plurality of strips of synthetic turf laid out on a floor of an indoor manufacturing facility for prefabrication processing in accordance with a preferred embodiment of the present invention.

The process for rolling out each strip 22 of turf is now described below in connection with FIG. 3. In accordance with one embodiment of the present invention, the selected strip 22 is rolled out across the width of the working area. To do this, a portable roll-up machine 36, upon which the roll of turf is disposed, is moved to the location where the work will be performed and then it is unrolled. Each strip 22 can be either unrolled manually or automatically. The entire length of the strip 22 should be rolled out and the strip 22 is then centered on the centerline 12. Also, once unrolled, the roll must be squarely aligned on the floor 10 with respect to the visual markings. It is preferred that a test is employed to ensure that each strip 22 is square with respect to the centerline 12. An exemplary test for ensuring this alignment is a 6-8-10 Pythagorean test. However, other suitable tests may also be employed. To be in alignment, the edges 30, 32 of each strip of synthetic turf are oriented perpendicular to lines 12, 14, 16, and 18. Once properly aligned and confirmed, the centerline 12 from the floor is marked on the back side 26 of the turf with permanent marking to assist in alignment of each strip 22 at the location of permanent installation, as generally designated by reference number 12'. It will understood by one of ordinary skill in the art that other steps may also be performed as is deemed necessary. The other markings from the floor can also be placed on the back side 26 of the strip 22 as necessary.

In addition to making available the strips to roll out and fabricate, the tufted inlays are also located in the facility. The inlays can all be located on a single strip of material such that they need to be cut out for subsequent insertion on the field. For example, a set of yard line numbers can be tufted in white on a single piece of backing material, such as generally indicated by the strip 38. It will also be understood that this strip 38 can have a variety of other numbers formed thereon. Alternatively, the inlays can be formed separately and individually. The backing material of the strip 38 should match or at least be compatible with the backing material for the remainder of the field. Also, the inlays for the hash marks are also tufted onto a piece of backing material, such as generally indicated by reference number 40. The hash marks are preferably formed in unbroken parallel lines to allow for subsequent cutting. Alternatively, they can be individually formed in the proper length. Any other indicia should be similarly formed. It will be appreciated that other ways of forming any necessary inlays may also be employed.

Figure 4A:
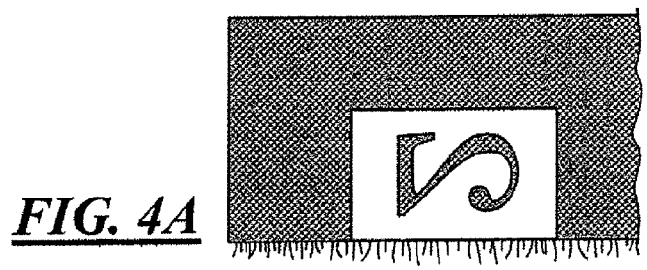
FIG. 4a schematically illustrates a template positioned on the back side of a strip of synthetic turf in accordance with a preferred embodiment of the present invention.
Figure 4B:
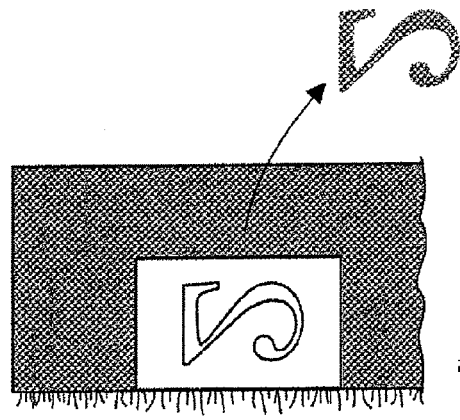
FIG. 4b schematically illustrates a section of synthetic turf matching the outline of the template being removed from the strip of FIG. 4a to allow insertion of a corresponding inlay in accordance with a preferred embodiment of the present invention.

Once the line 12' has been marked or disposed on the back side 26 of the turf, any indicia, lines or other field markings can then be inserted into each strip 22. To accomplish this, the necessary templates corresponding to the appropriate inlays to be inserted into each strip are gathered from within the facility. Next, one of the templates is positioned on the back side 22 of the turf in the proper location for processing. For example, with reference to FIG. 4a, a template 50 in the shape of the number to be inserted in the selected strip is gathered and then placed on the back side 26 of the turf in the proper orientation. The template 50 is then secured in place on the back side 26 of the turf. Using a suitable cutting tool, a hole is then made through the turf backing around the perimeter 52 of the template 50, such that a cut is made in the strip 22 in the shape of the inlay to be inserted. The cut out is then removed from the strips 22, as shown in FIG. 4b. The removable cut out is then placed to the side as scrap. This step is then repeated for all of the markings that are to be inserted into each strip 22 of the field 10. The obvious difference between subsequent processes is that the shape of the template will vary depending upon the inlay to be inserted into the field. Other steps may also be performed as needed.

Once the holes corresponding to the templates 50 as well as the items to be inserted into the field have been formed, the next step is then to adhere the inlays to the field. Specifically, the numbers, the hash marks, the arrows and/or other ancillary markings are gathered for insertion into the created openings to form a part of the final field. Prior to adhering the necessary inlay to each individual strip, it should be ensured that the construction of each inlay matches the construction of the strip 22 into which it is going to be inserted. The template 50 should also be removed from the back side 26 of the turf. Next, the appropriate adhering mechanism, such as seam tape, adhesive, and/or other applicator tools are gathered. Thereafter, the inlay is inserted into the matching inlay opening formed in the strip 22. The inlay is then secured to the strip 22 by glue or another appropriate adhering method. These steps should be repeated for all inlays on each strip until all inlays for the field have been inserted. It will be appreciated that other suitable steps may also be performed as required.

After each inlay has been inserted into the strip 22, the adhesive used to secure the inlay to the strip 22 must be allowed to cure for a sufficient number of hours. The curing time may obviously vary depending upon the type of adhesive used. While the adhesive is curing, the strip 22 in which the inlay has been secured should remain untouched in its flat position. Also, weight may also be applied to the inlay to facilitate curing.

Figure 5:
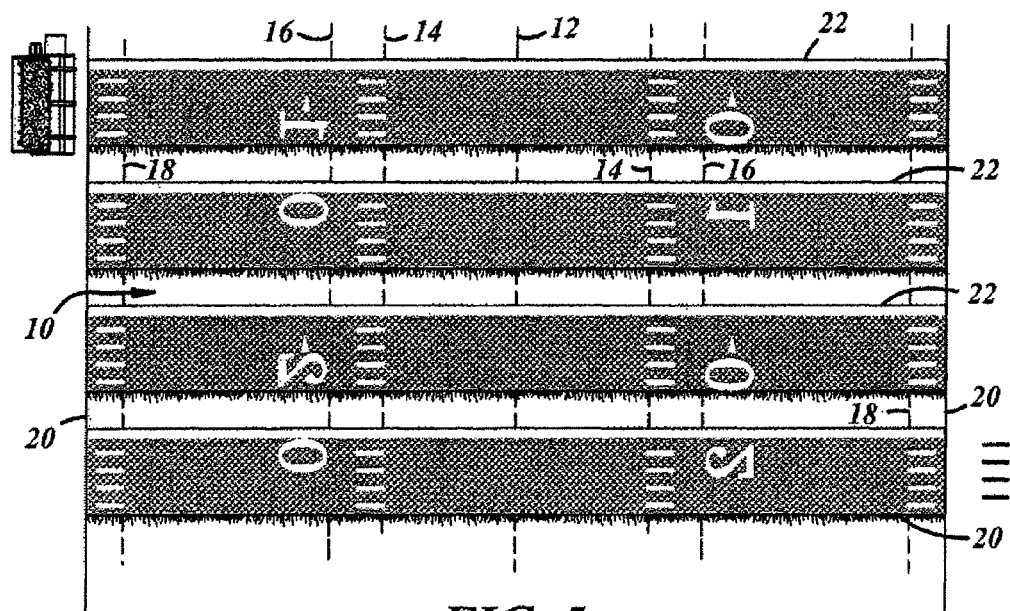
FIG. 5 is a schematic illustration of the plurality of strips of synthetic turf of FIG. 3 after insertion of inlays into the strips in accordance with a preferred embodiment of the present invention.

FIG. 5 illustrates a plurality of strips 22 after the prefabrication process has been completed. As shown, the strips 22 have been cut such that each end 56 thereof is aligned with the side line 20. Also, the strips 22 are positioned such that the centerline 12 bisects each strip 22. Further, the inlays have been inserted and are aligned with their respective lines 14, 16, and 18. The strips 22 are still upside down and can now be rolled up. Thereafter, the portable roll-up mechanism 36 should be positioned at the proper end 56 of the strip 22. The core (center for each strip 22 when rolled-up) is attached to the portable roll-up mechanism 36. The strip 22 is then secured to one end of the roll-up mechanism 36 and rolled up around the core. Once each strip 22 has been rolled-up around its respective core, it is then placed in a bag or other suitable retention mechanism and labeled according to a seaming diagram to facilitate staging during installation. The rolls are then ready for shipping and installation at the job site.

Figure 6:
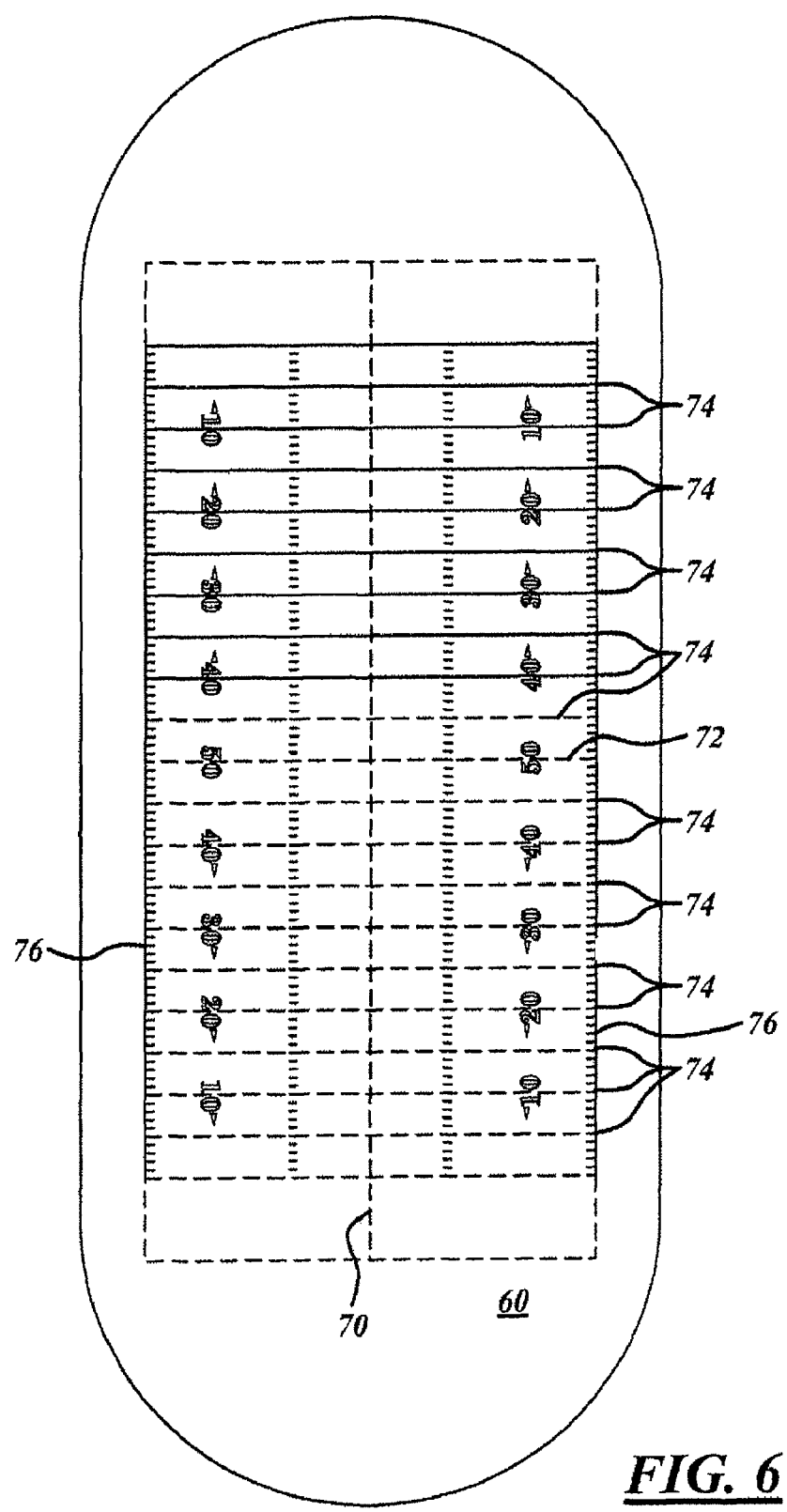
FIG. 6 is a schematic illustration demonstrating the installation of a synthetic turf field at its installation site in accordance with a preferred embodiment of the present invention.

Referring now to FIG. 6, which illustrates an exemplary installation of a synthetic field in accordance with a preferred embodiment of the present invention. The first step in the installation process is to ensure that the base or sub-base upon which the field will be installed is certified for installation. Next, all markings for the field are precisely placed on the top surface of the base, with a suitable marking such as paint. This will assist in properly aligning the strips. The centerline of the field is then marked on the sub-base from goal post to goal post, as generally shown by line 70. The line 70 is necessary for alignment of the strips 22 and inlays for prefabricated fields. The center of the field is intended to match the centerline 12 on the floor 10 of the facility 5.

In accordance with the preferred embodiment, the next step in the installation process is to square off the center of the field and identify the location of the fifty (50) yard line. The midfield line is then marked on the sub-base as generally indicated by reference number 72. Also, the individual yard line markings are marked on the sub-base 60 such they are perpendicular to the centerline of the field 70. Next, the yard lines need to be marked from one side of the field to the other side of the field. A set off is required to line up the edge of the strip 22 having the white yard line. This set off is preferably about two (2) inches. Next, every five yards from the fifty (50) yard line to each end zone are marked on the sub-base 60, as generally indicated by reference number 74. Additionally, the sidelines are marked on the field in the proper location.

Figure 7:
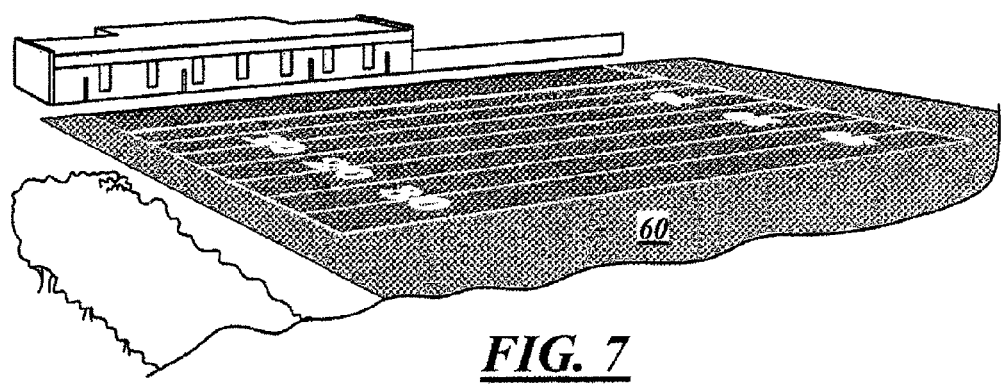
FIG. 7 is a schematic illustration of the installation process of a synthetic turf field in accordance with preferred embodiment of the present invention.

With reference to FIG. 7, the first step of the installation process involves placing the first roll at the fifty (50) yard line and the white yard line of that roll is lined up with the midfield marking 72 on the sub-base 60. Additionally, the centerline 70 of the sub-base is aligned with the centerline 12' marked on the back side 26 of the strip 22. Next, the other strips 22 are rolled out in the appropriate order based on the inlaid yard line markings and laid out on the sub-base 60. Once several strips 22 have been rolled out and aligned, in accordance with the preferred embodiment, the markings are rechecked to ensure alignment before the midfield strip is secured with spikes or other suitable securing means to hold the piece in place. Once the strips 22 are aligned, the seams of the strips 22 are cut and secured, such as by gluing or securing, in accordance with known industry standard methods. Lastly, the side lines can be installed in accordance with known methods. This results in an installation process that is less costly, more accurate and requires less time to complete.

While particular embodiments of the invention have been shown and described, numerous variations or alternate embodiments will occur to those skilled in the art. Accordingly, it is intended that the invention be limited only in terms of the appended claims.

The invention claimed is:

1. A method comprising:
    indicating dimensions on a floor at an indoor facility, the dimensions corresponding to locations on a field at a facility that is separate from the indoor facility;
    positioning one or more strips of synthetic turf onto the floor such that an underside portion of the one or more strips faces upward;
    inlaying markings into the underside portion of the one or more strips, the markings corresponding to at least some of the dimensions on the floor; and
    preparing the one or more strips for transporting to the facility that is separate from the indoor facility.

2. The method of claim 1, wherein the field is a sports field, and wherein the dimensions comprise:
    a centerline that corresponds to a center of the sports field;
    one or more lines substantially parallel to the centerline, wherein the one or more lines correspond to at least one of: a plurality of hash marks, a plurality of yard line numbers, and a plurality of sidelines on the sports field.

3. The method of claim 2, wherein positioning the one or more strips comprises:
    rolling the one or more strips across at least a portion of the floor such that a line of the plurality of lines on the underside portion of the one or more strips is aligned with the centerline and other lines of the plurality of lines are aligned with the one or more lines.

4. The method of claim 2, wherein positioning the one or more strips further comprises cutting the one or more strips such that a first edge of the one or more strips aligns with a first sideline of the plurality of sidelines and a second edge of the one or more strips aligns with a second sideline of the plurality of sidelines.

5. The method of claim 2, wherein the inlaying of markings into the one or more strips comprises inlaying markings that correspond to at least a portion of an end zone of the sports field.

6. The method of claim 1, further comprising:
    positioning a second strip of synthetic turf onto the floor such that a first edge of the second strip is aligned with an edge of the one or more strips; and
    positioning a third strip of synthetic turf onto the floor such that a second edge of the second strip is aligned with an edge of the third strip.

7. The method of claim 1, wherein the inlaying comprises:
    cutting out one or more inlays from a material;
    placing a template on the one or more strips, the template corresponding to an inlay of the one or more inlays;
    cutting out a portion of the one or more strips such that a cut-out matching the shape of the one or more inlays is created in the one or more strips; and
    adhering the one or more inlays to the matching cut-out portion.

8. The method of claim 7, further comprising applying a weight to the one or more inlays after the one or more inlays has been adhered to the cut-out portion.

9. The method of claim 1, wherein the field is a football field comprising end zones and wherein some of the dimensions correspond to the end zones.

10. The method of claim 1, wherein the underside portion of the one or more strips comprises a base material having a plurality of rows of tufted yarn secured to the base material, the plurality of rows of tufted yarn extending outwardly from a top of the one or more strips.

11. The method of claim 1, wherein the indoor facility has sufficient space to store equipment for the indicating, positioning, inlaying, and preparing.

12. The method of claim 1, further comprising installing the one or more strips at the facility that is separate from the indoor facility to form a synthetic field.

* * * * *